B. F. OSGOOD.
METHOD OF STAKING HORSE POWERS
105238
PATENTED JUL 12 1870
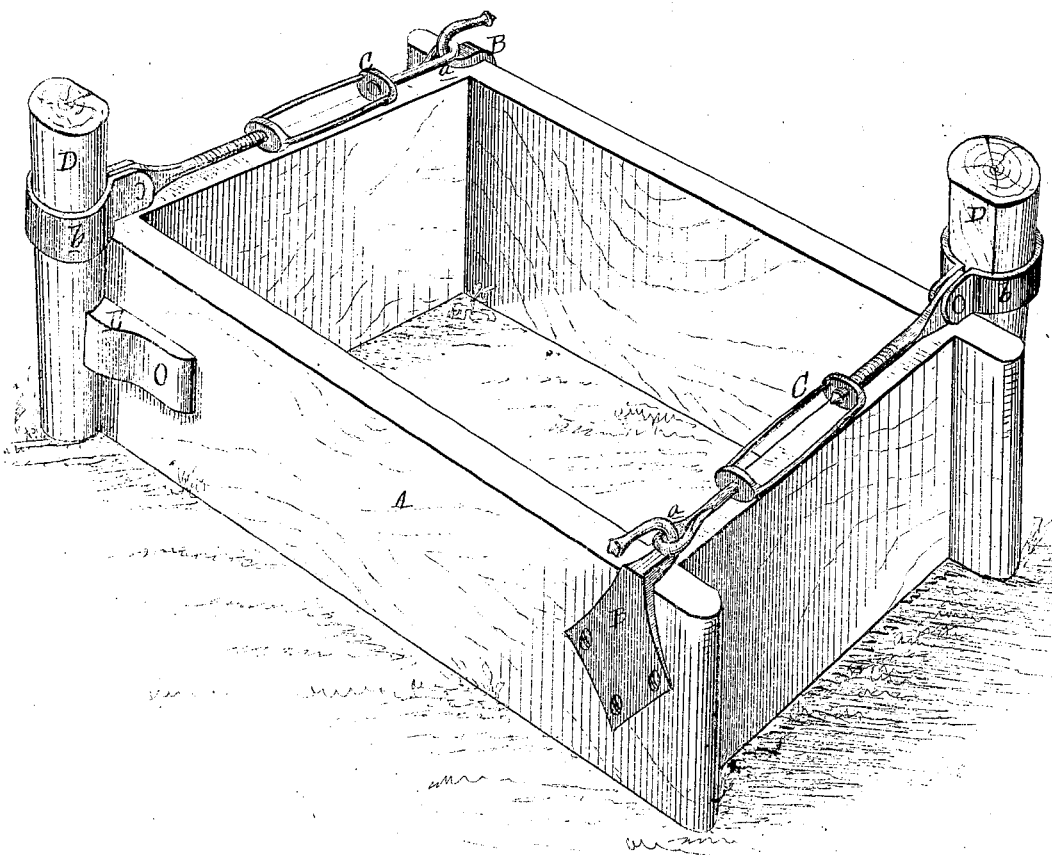
ATTEST
Sam J. Spray
Frank Dunlap
INVENTOR
B. F. Osgood
his atty
Thos. S. Sprague

United States Patent Office.

BENJAMIN F. OSGOOD, OF COLOMA, MICHIGAN.

Letters Patent No. 105,238, dated July 12, 1870.

IMPROVEMENT IN APPARATUS FOR STAKING HORSE-POWERS.

The Schedule referred to in these Letters Patent and making part of the same

To whom it may concern:

Be it known that I, BENJAMIN F. OSGOOD, of Coloma, in the county of Berrien and State of Michigan, have invented a new and useful Improvement in Apparatus for Staking Horse-Powers; and I do declare that the following is a true and accurate description thereof, reference being had to the accompanying drawing, and to the letters of reference marked thereon and being a part of this specification.

In the accompanying drawing my apparatus for securing horse-powers to the ground is shown in perspective.

The nature of this invention relates to a new, simple, and ingenious device whereby horse-powers are more firmly staked to the ground than in the ordinary manner, with a great saving of manual labor in so doing and in a tithe of the time usually employed.

It consists in driving two suitable stakes into the ground just outside the alternate opposite corners of horse-power frame or bed, and securing the same to them by means of proper swivels, as more fully hereinafter set forth.

In the drawing—

A represents the bed-frame of a horse-power, on the sides, near the ends, and extending over the top edge, at alternate opposite corners, are the metallic hooks B, suitably fastened to the bed-frame by bolts or otherwise. The hook is designed to engage with the eye a of the swivel C, as shown, the other end of which is provided with a suitable loop, b, to receive the stake D.

E is a lug on the side of the horse-power, against which the stake D is driven, effectually preventing the bed-frame from being slipped endwise.

In order to better understand my invention I will suppose the horse-power has been placed on the ground where it is desired to be secured, near the end of the bed-frame, and in the angle formed by it and the end of the lug E the stake D is driven; the loop b on the swivel C is then slipped over the end thereof, the other end engaging with the hook B; the swivel-link is then turned in the usual manner until the stake is drawn up solidly against the frame, which firmly binds the said frame to the stakes, as shown.

What I claim as my invention, and desire to secure by Letters Patent, is—

The swivel C, provided with eye a and loop b, in combination with the hook B and stake D, for the purpose of securing the bed A of a horse-power, or equivalent purposes, to the ground, as herein set forth.

BENJAMIN F. OSGOOD.

Witnesses:
J. H. MARVIN,
WILLIAM SIMPSON.